United States Patent [19]

Wittkopp et al.

[11] 4,195,957
[45] Apr. 1, 1980

[54] BORING TOOL WITH FLOATING DOUBLE EDGED KNIFE

[75] Inventors: Helmut Wittkopp; Garrj Berstein, both of Erkelenz; Lothar Heymanns, Rheydt-Odenkirchen; Willi Hansen, Erkelenz, all of Fed. Rep. of Germany

[73] Assignee: Wilhelm Hegenscheidt Gesellschaft mit beschraenkter Haftung, Erkelenz, Fed. Rep. of Germany

[21] Appl. No.: 916,245

[22] Filed: Jun. 16, 1978

[30] Foreign Application Priority Data

Jun. 23, 1977 [DE] Fed. Rep. of Germany ....... 2728258

[51] Int. Cl.² .............................................. B23B 47/18
[52] U.S. Cl. ................................. 408/148; 408/159; 408/180
[58] Field of Search ............ 408/159, 180, 150, 187, 408/188, 147, 148, 713, 201

[56] References Cited

U.S. PATENT DOCUMENTS

| 1,096,799 | 5/1914 | Weeks | 408/180 |
| 1,530,293 | 3/1925 | Breitenstein | 408/148 |
| 2,247,284 | 6/1941 | Young | 408/148 X |
| 2,273,228 | 2/1942 | Smith | 408/159 X |
| 2,916,951 | 12/1959 | Carlson et al. | 408/159 X |
| 2,959,109 | 11/1960 | Buchan | 408/159 X |
| 3,008,360 | 11/1961 | Winberry, Jr. | 408/180 |
| 3,170,224 | 2/1965 | Johnson | 408/713 X |
| 3,318,175 | 5/1967 | Gogsdill | 408/201 X |
| 3,827,821 | 8/1974 | Swenson | 408/159 X |

FOREIGN PATENT DOCUMENTS

122364  7/1948 Sweden .................. 408/159

*Primary Examiner*—William R. Briggs
*Attorney, Agent, or Firm*—Michael J. Striker

[57] ABSTRACT

A boring tool having a tool head rotatable about its axis and movable in direction of the axis along a working stroke and a return stroke. A knife having a pair of opposite cutting edges is floatingly mounted in a slot of the tool head extending transverse to the axis thereof and tiltable in the slot between a working position and a withdrawal position in which the cutting edges of the knife project a smaller distance beyond the periphery of the tool head than in the working position to prevent damage of the machined surface during the return stroke of the tool head.

18 Claims, 9 Drawing Figures

BORING TOOL WITH FLOATING DOUBLE EDGED KNIFE

BACKGROUND OF THE INVENTION

Boring tools are known in the art in which a tool head is provided with a slot extending transverse to the axis of the tool head and in which a double edged cutting knife is arranged. Such a boring tool is for instance disclosed in the "Schriftenreihe Feinbearbeitung: Feinbohren und Feinbearbeitung von Bohrungen", January 1958, page 28. The boring tool disclosed therein has a cutting knife with opposite cutting edges mounted in fixed position, which therefore has to be removed from the tool head after the bore has been machined, to avoid markings on the bore surface during retraction of the boring tool.

The same article discloses on page 43 another boring tool in which a pair of opposite cutting knives may be moved toward and away from each other by an oppositely threaded pin engaged in corresponding bores in the cutting knives. In this way the cutting knives may be easily adjusted to any desired tolerance of the bore to be finished, but in this construction, too, the two cutting knives have to be withdrawn from the tool head before the latter is retracted in axial direction of the finished bore in order to avoid markings during withdrawing of the tool head from the bore.

Such boring tools may also be combined with other tools, for instance with rolling tools, in order to finish cylinder bores in one operation. Such a combined tool is, for instance, disclosed in the U.S. Pat. No. 3,973,319. In this construction a rolling tool is arranged behind the cutting tool and the cutting tool carries out a rough finishing of the inner surface of the bore, whereas the following rolling tool produces during the same operation a fine surface quality of the bore surface. In this construction the boring tool has to be also removed from the tool head in order to assure that the finely finished surface is not damaged during retraction of the combined tool.

Such a necessary removal of the cutting tool is disadvantageous, since, on the one hand, it prevents automatization of the machining operation in, for instance, a deep boring machine, and on the other hand, it results in a time loss during manual operation, since the tool spindle in the deep boring machine has to be brought at the end of the boring operation to a suitable position permitting withdrawal of the cutting knife or knives. Furthermore, such an operation is also disagreeable for the operator, since the boring tool is covered with oil.

The DT-OS 22 23 696 discloses a boring tool in which a pair of opposite knives, guided in a slot transverse to the axis of the boring tool may be moved in radial outward direction by a cone movable between the inner ends of the knives, but this adjustment must also be carried out by hand, so that an automatic operation cycle has to be interrupted for manually adjusting the knives. In this construction the knives have also to be retracted, by adjusting the position of the cone, in order to avoid damage to the finished bore surface during withdrawal of the boring tool, and the readjustment of the knives to the necessary working tolerance must be carried out very carefully in order to provide the same result during finishing of a second bore.

SUMMARY OF THE INVENTION

It is an object of the present invention to provide a boring tool of the aforementioned kind which avoids the above-mentioned disadvantages.

It is a further object of the present invention to provide a boring tool having a cutting knife with opposite cutting edges which can be moved in a simple manner between a working and an inactive withdrawal position in which the opposite cutting edges of the knife project a smaller distance beyond the periphery of the tool head than in the working position, to prevent damage of the machined surface during the return stroke of the tool head.

It is an additional object of the present invention to provide a boring tool of the aforementioned kind in which the movement of the cutting knife between the positions thereof may be also carried out automatically and in such a manner that successive bores may be machined to the same tolerance.

With these and other objects in view, which will become apparent as the description proceeds, the boring tool according to the present invention mainly comprises a tool head having an axis and being turnable about the axis and movable in the direction of the axis along a working stroke and a return stroke, a cutting knife having opposite cutting edges projecting beyond the tool head, and means mounting the cutting knife on the tool head for oscillating movement transverse to the axis and for tilting movement in a plane including the axis between a working position and a withdrawal position in which the cutting edges project through a smaller distance beyond the tool head than in the working position.

Preferably the mounting means comprise a slot in the tool head extending transverse to the axis through the tool head, with the width of the slot continuously increasing in the direction of movement of the tool head during its working stroke from one to the other end of the slot. The knife is adapted to abut against one face of the slot during the working stroke of the tool to be thereby maintained in the working position and, according to one modification of the present invention, the tool includes also means to at least temporarily press the knife against the aforementioned face. Such pressing means may comprise resilient means biased to yieldably maintain the knife in abutment with the aforementioned face of the slot and wherein the knife during the withdrawal stroke of the tool is automatically tilted to its withdrawal position by the friction between the cutting edges and the bored surface. The biasing force of the resilient means has in this case to be smaller than the friction force between the cutting edges and the bore surface to avoid during withdrawal of the tool any markings on the bore surface. Such an arrangement, which is characterized by its extreme simplicity, can be used for machining relatively hard workpieces.

According to a further modification the aforementioned arrangement in which resilient means yieldably maintain the knife in its working position may be combined with an arrangement for automatically tilting the knife against the force of the resilient means to its withdrawal position, to thus positively avoid any markings on the machined surface during withdrawal of the tool, even if the latter is used for machining of relatively soft workpieces.

According to a further modification, the arrangement includes means cooperating with the knife for positively tilting the same between a working position and withdrawal position during the working stroke of the tool head, respectively the return stroke of the latter.

Such means for positively tilting the knife between its working position and its withdrawal position may include electromagnet means including an armature and a spool surrounding the armature, so that the armature may be pulled into the spool to thereby move the knife to the working position and pushed out of the spool to thereby pull the knife to the withdrawal position.

According to a further feature of the present invention the arrangement may also include means for maintaining the cutting edges of the knife, when the latter is in the withdrawal position, equally spaced from the axis of the tool. Such an arrangement may include a preferably radially adjustable positioning bolt projecting beyond the surface of the slot against which the tool abuts in the withdrawal position and a corresponding cutout in the opposite face of the knife.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
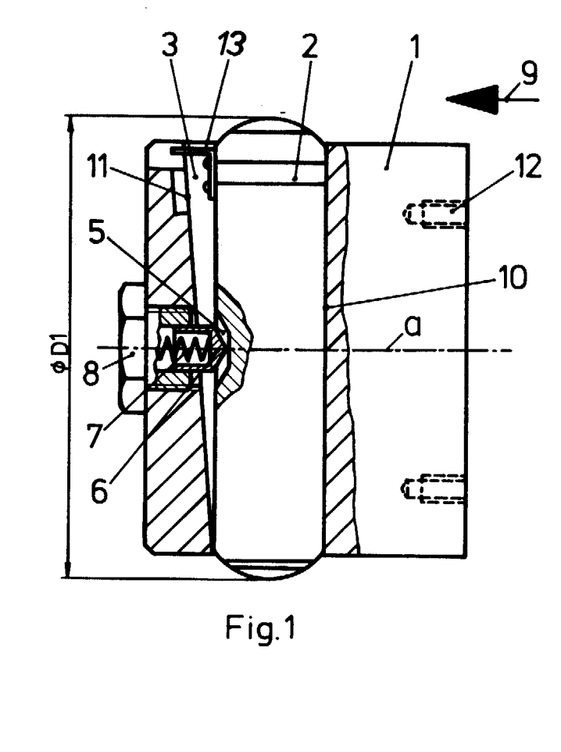
FIG. 1 is a partially sectioned side view of the boring tool head according to the present invention and showing the knife thereof in its working position.
Figure 2:
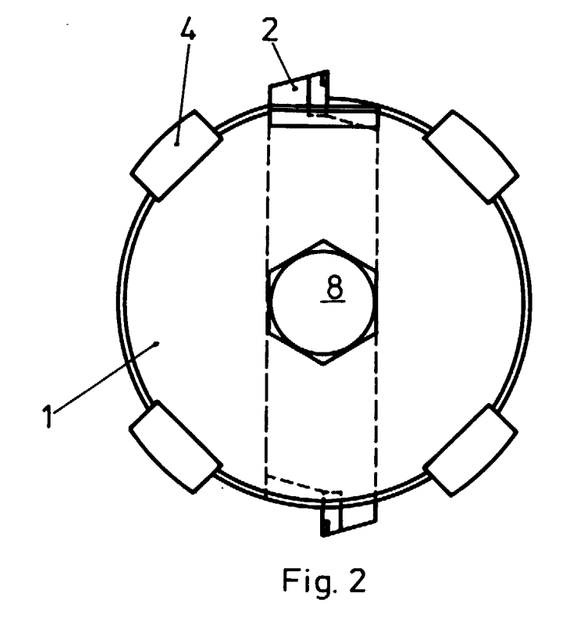
FIG. 2 is a front view of the boring tool shown in FIG. 1.
Figure 3:
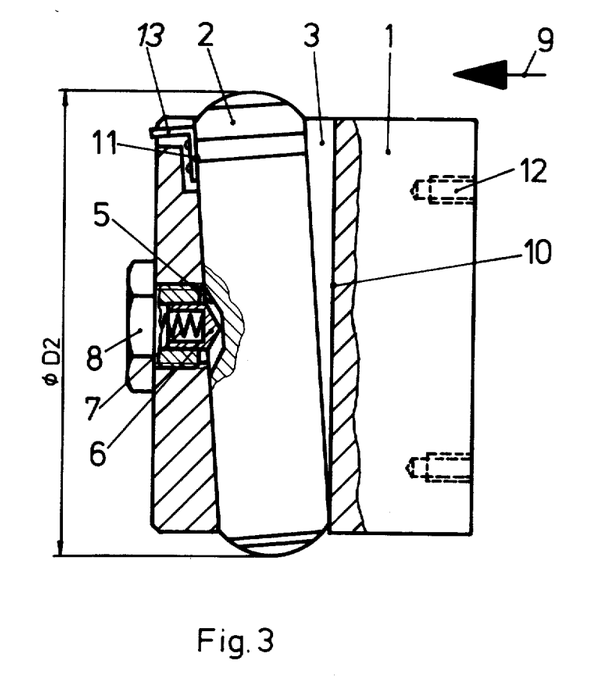
FIG. 3 is a partially sectioned side view of the boring tool shown in FIG. 1, with the knife shown in its withdrawal position.

Referring now to the drawing, and more specifically to FIGS. 1-3 of the same, it will be seen that the boring tool according to the present invention includes a substantially cylindrical tool head or housing 1 formed with a slot 3 of rectangular cross-section and extending transverse to the axis a of the tool head 1 through the latter, in which the width of the slot increases from one to the other end thereof. A cutting knife 2, having opposite cutting edges projecting beyond the periphery of the tool head 1, is floatingly arranged in the slot 3 and tiltable between a working position shown in FIG. 1 and a withdrawal position shown in FIG. 3. In the working position, in which the tool head 1 is rotated about its axis and advanced in the direction as indicated by the arrow 9, the knife 2 abuts with one face thereof against the face 10 of the slot, which preferably extends normal to the axis of the tool head 1, whereas in the withdrawal position the knife 2 abuts with an opposite face thereof against the abutment face 11 of the slot, which is inclined with respect to the face 10 as shown in FIGS. 1 and 3. The tool head 1 may be provided at its rear face thereof with a plurality of threaded bores 12 for connecting the tool head to a tool head carrier 29 of known construction and schematically indicated, for instance in FIG. 4. In its working position, as shown in FIG. 1, the opposite cutting edges of the knife are located with the outer ends thereof along an active diameter D1. If the bore in the non-illustrated workpiece is machined to the desired depth, the tool head 1 is withdrawn in a direction opposite to the direction as indicated by the arrow 9. The machined bore in the workpiece is, due to an elastic radial springback of the material of the workpiece, slightly smaller than the active diameter D1. This is the reason that, in such tools according to the prior art, withdrawal grooves are formed in the machined surface during the return stroke of the tool head. Since the finish formed bore surface is slightly smaller than the active diameter D1, a friction force will be created at the two cutting edges of the knife 2 during the return stroke of the tool head and such friction forces, which are not opposed at the enlarged end of the slot 3, will cause tilting of the knife 2 to the position shown in FIG. 3, during the return stroke of the tool head 1. By this tilting of the knife 2 the active diameter D1 will evidently be reduced to the diameter D2, shown in FIG. 3, so that the tool head may now be withdrawn, while withdrawal grooves on the machined surface are positively avoided. In order to assure that the knife 2 is maintained in proper position during the next boring operation, it is, for instance, possible to press the knife 2 by means of a pressure element 6, which is, for instance, slidingly arranged in a bore of a screw 8, with a small force against the support face 10. The necessary pressure force can, for instance, be obtained by a coil compression spring 7 arranged in the bore of the screw 8 and extending into an aligned blind bore in the element 6. The spring 7 will cause, however, that the cutting edges of the knife 2 will remain in contact with the machined bore surface also during the return stroke of the tool. The spring 7 must, therefore, be constructed in such a manner so as to not preclude a tilting of the knife 2 toward the inclined face 11 of the slot under the influence of the friction between the cutting edges of the knife and the machined bore surface during the return stroke of the tool to avoid markings of the machine surface during such return stroke.

The knife 2 may also be provided at its face thereof opposite the inclined face 11 of the slot with a cutout 5 in which the pressure element 6 engages, which will assure that the knife will not slip out of the lot in an undesired manner if the tool head projects beyond the bore in the workpiece. The cutout 5 is elongated in the longitudinal direction of the knife 2 so as to permit an oscillating movement of the latter in the slot 3.

Figure 4:
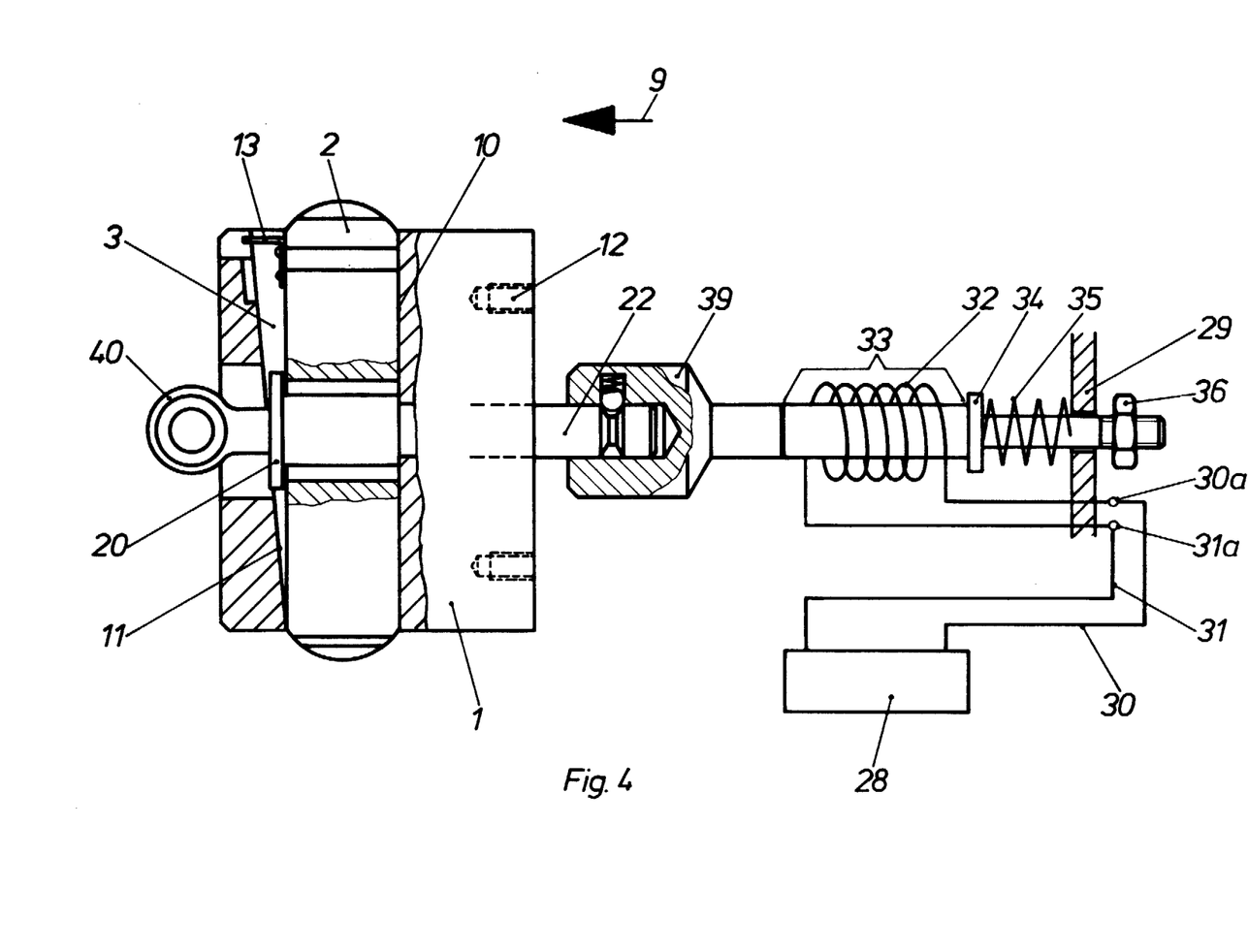
FIGS. 4-9 illustrate various modifications of the arrangement according to the present invention for tilting the knife of the boring tool between the positions thereof.
Figure 5:
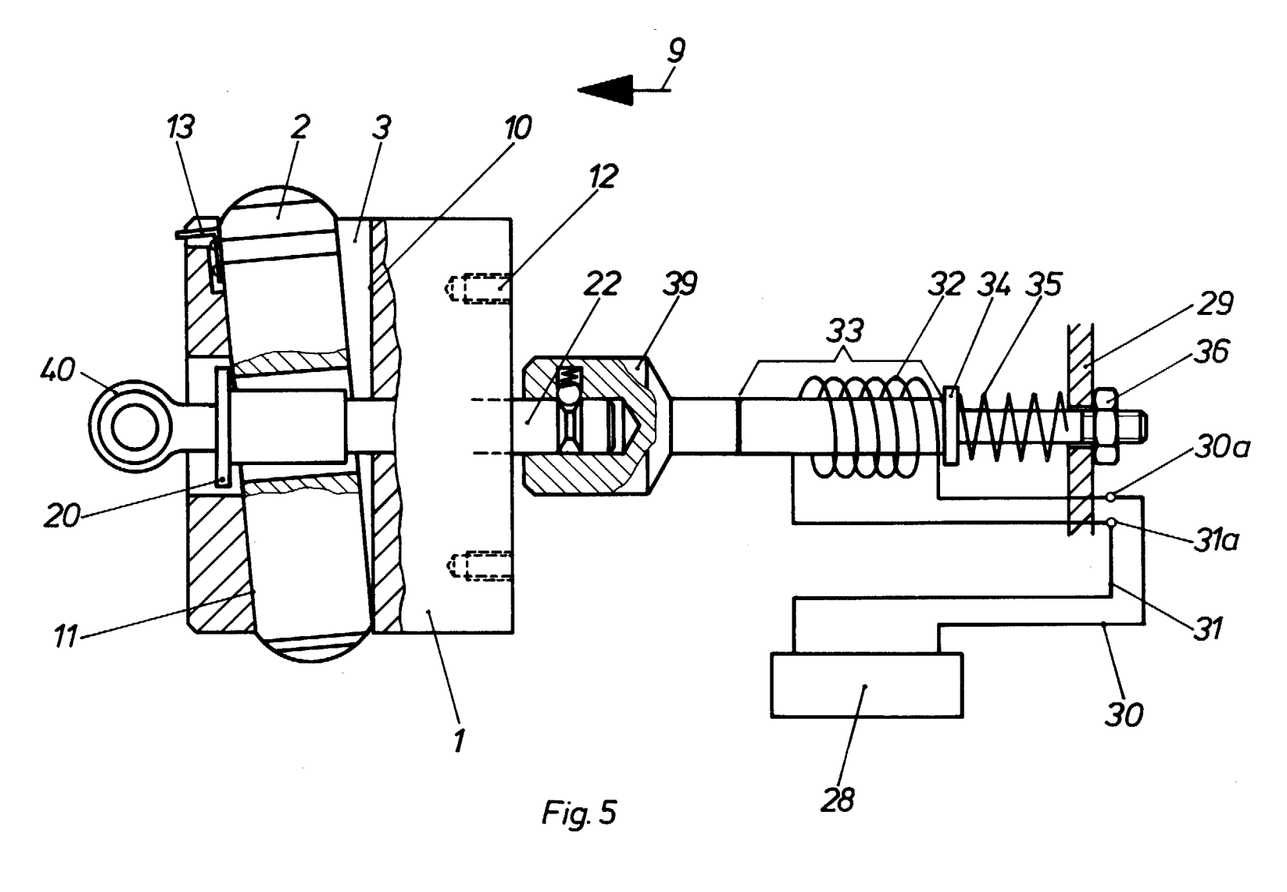

During machining of especially soft workpieces it is possible that the engagement of the cutting edges of the knife 2 with the finished bore surface may be strong enough to produce markings during this return stroke of the tool. In order to avoid this, it is necessary, that the knife 2 be freely tilted to its withdrawal position. On the other hand, it is necessary to move the knife at the end of the return stroke of the tool again to its working position. Principally such a movement of the knife to its working position at the start of the working stroke of the tool head will automatically occur due to the engagement of the cutting edges of the knife with the smaller, not yet machined, bore diameter of the workpiece. If the plus tolerance of the workpiece bore at the start of the boring operation is, for any reason whatsoever, very small, then it is possible that the knife, at the beginning of the working stroke of the tool head, will not automatically move to its working position. For this reason a forced movement of the knife to its working position at the beginning of the working stroke of the tool is in any case desirable. In order to assure, on the one hand, a positive movement of the knife 2 to its working position at the start of the working stroke of the tool head and, on the other hand, to assure a force free tilting of the knife to its withdrawal position, the present invention includes also a modification as shown in FIGS. 4 and 5. This modification includes actuating means 22 in form of a rod extending axially through a central bore in the knife 2, which bore has a diameter greater than the diameter of the rod so as not to preclude an oscillating movement of the knife 2 in the slot 3. The rod 22 is connected by a releasable coupling 39 to a coaxial armature 33 of an electromagnet having a spool 32 surrounding the armature and in which the latter is freely movable. The rod-shaped actuating means 22 is provided at its front end, shown in FIGS. 4 and 5, as the left end, with a collar 20 having a diameter greater than the bore through the knife 2. During axial movement of the rod-shaped actuating means 22 in the direction opposite to the direction indicated by the arrow 9, the collar 20 will engage the front face of the knife 2 to move the latter to its working position shown in FIG. 4, in which the knife abuts with its rear face thereof against the face 10 of the slot 3. The movement of the rod-shaped actuating means 22 in the aforementioned direction is obtained by energizing the spool 32 from a control mechanism 28, of known construction and schematically shown in FIGS. 4 and 5, over the conductors 30 and 31 and the connectors 30a and 31a, which preferably are arranged on the tool head carrier 29, so that the armature 33 is pulled into the spool 32 of the electromagnet. During such movement of the armature 33, a bolt 34, axially movable mounted in the tool holder 29 coaxial with the armature 33 and biased by a spring 35 in the direction of the arrow 9, is moved against the force of the spring 35 is axial direction through the same distance as the armature 33. After start of the machining operation in a new workpiece, the control mechanism 28 will interrupt first the supply of current to the spool 2, whereby the complete moving mechanism is moved by the force of the spring 35 in forward direction, that is to the left, as viewed in FIGS. 4 and 5 until a further movement is prevented by the abutment of a nut 36 on the bolt 34 against the tool holder 29. In this position, of the actuating means, as shown in FIG. 5, the knife may freely tilt to its withdrawal position at the start of the return stroke of the tool head 1. In order to exchange the knife in a simple manner, it is, for instance, possible to withdrawn the rod-shaped actuating means 22 from the coupling 39 by means of the grip portion 40 projecting beyond the tool head 1 in axial direction. A new knife may then be placed into the slot 3 of the tool head and thereafter the rod-shaped actuating means 22 may be again pushed into the coupling 39.

Figure 6:
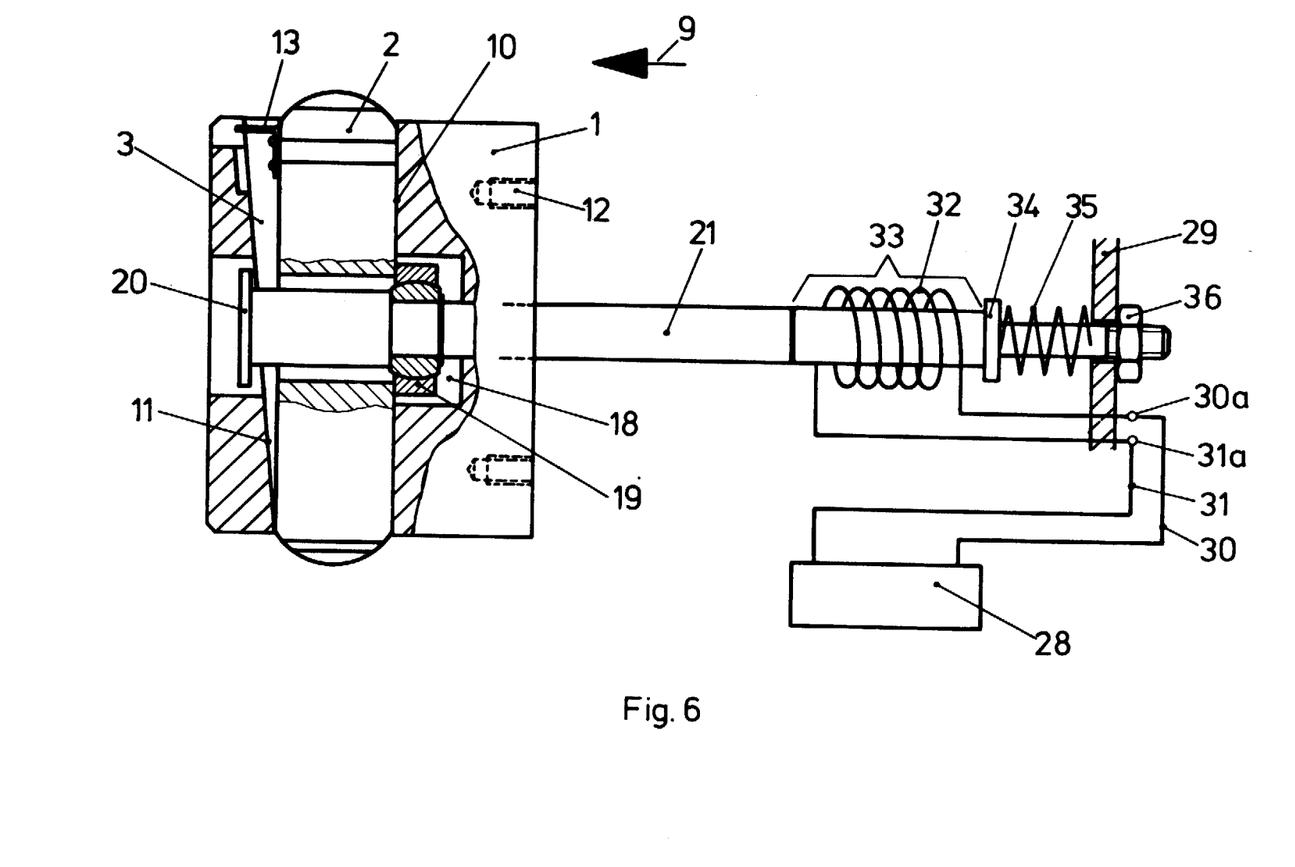
Figure 7:
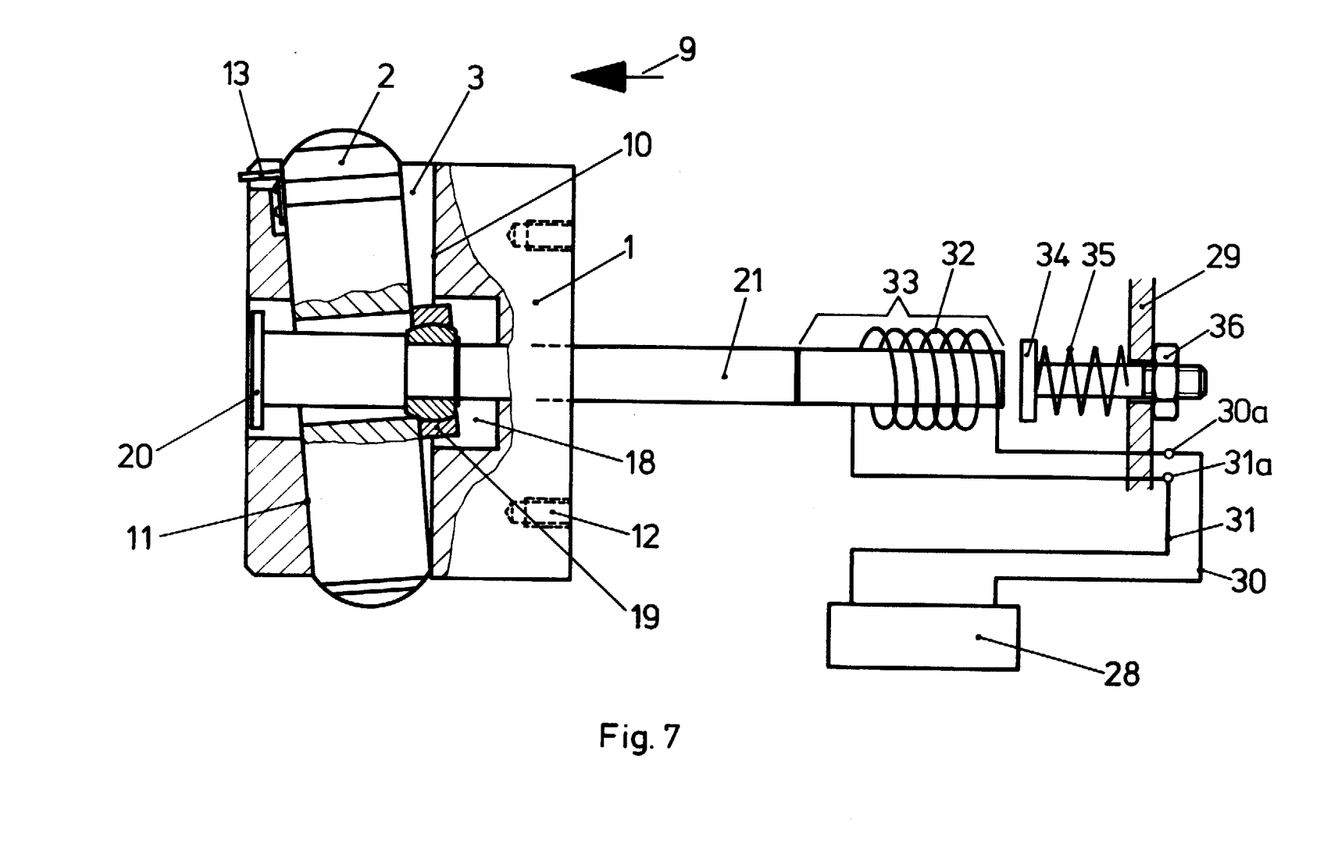

Under certain conditions it may be desirable to bring the knife 2 not only forcefully to its working position, but to tilt it also positively to its withdrawal position. Such an arrangement is illustrated in FIGS. 6 and 7. As shown in these Figures the arrangement includes a rod-shaped actuating means 21 extending through a corresponding bore in the knife 2 having a diameter greater than the diameter of the rod, to permit face oscillating movement of the knife 2 in the slot 3. The rod 21 is provided at its front end, or left end as viewed in FIG. 6, with a collar 20 having a diameter greater than the bore through the knife 2 and axially spaced from the collar 20 with an abutment 19, which is preferably in the form of a spherical bearing. The axial distance between the collar 20 and the abutment 19 is such, that when the knife is in its working position, as shown in FIG. 6, and the abutment 19 abuts against one end face of the knife, the collar 20 is spaced from the opposite end face of the knife a distance so as to permit free tilting of the knife to its withdrawal position. The axial movement of the rod-shaped actuating means 21 may also in this embodiment be produced by electromagnetic means including an armature 33 connected coaxially to the rod 21 and axially movable in a spool 32 of the electromagnet connected in the manner as described in connection with the embodiment shown in FIGS. 4 and 5 to a control mechanism 28. If the spool 32 is energized by the control mechanism 28, then the armature 33 is moved axially into the spool, taking thereby the rod-shaped actuating mechanism 21 along, so that the collar 20 engages the front face of the knife 2 to move the latter to its working position. This movement will simultaneously move the bolt 34, abutting with its left end, as viewed in FIG. 6, against the right end of the armature 33, against the force of the coil spring 35 in axial direction, compressing thereby the coil spring 35. Immediately after start of the working stroke of the tool the supply of current to the spool 32 is interrupted by the control mechanism 28 so that the bolt under the force of the spring 35 moves toward the left, as viewed in FIG. 6, until the stop nut 36 abuts against the tool holder 29 to move thereby the rod-shaped actuating means 21 to a neutral position as shown in FIG. 6. In this neutral position the abutment 19 abuts against the knife 2 in its working position. The front collar 20 is thereby moved away from the front face of the knife for a distance so that the latter may freely tilt to its withdrawal position. After finishing of the working stroke of the tool head 1, the spool 32 is poled by the control mechanism 28 in opposite direction and again energized. Thereby the armature 33 is pushed out of the spool and the rod-shaped mechanism 21 is moved toward the left, as viewed in FIG. 7, tilting thereby the knife 2 to its withdrawal position as shown in FIG. 7.

Since the tilting of the knife 2 in all cases occurs unilaterally, the symmetrical position of the knife is lost after the tilting movement into the withdrawal position. During the return stroke of the tool it is therefore necessary to move the knife 2, located in its withdrawal position, by contact with the workpiece in radial direction until a free passage of the knife through the bore of the workpiece is possible. Thereby, the knife will come at the beginning of the withdrawal stroke in contact with the workpiece. During the further movement of the tool along its return stroke, a very small residual contact between the knife and the machined workpiece surface will remain. In extremely soft workpieces this residual contact will still produce a visible marking. This can be prevented according to the present invention by bringing the oscillating knife 2 prior to the return stroke of the tool head into an exact symmetrical position. This result may be obtained by an arrangement illustrated in FIGS. 8 and 9, which includes a positioning bolt 15 arrangement in a cutout in the front end of the tool head 1 and projecting in axial direction beyond the face 11 of the slot 3. The positioning bolt 15, which preferably has a spherical end, is, by means of an adjusting element 14, adjustable in radial direction and by means of an element 16 fixable in the adjusted position. The positioning bolt engages in a V-shaped or conical depression 17 formed in the front face of the knife 2, when the latter is tilted to its withdrawal position.

Figure 8:
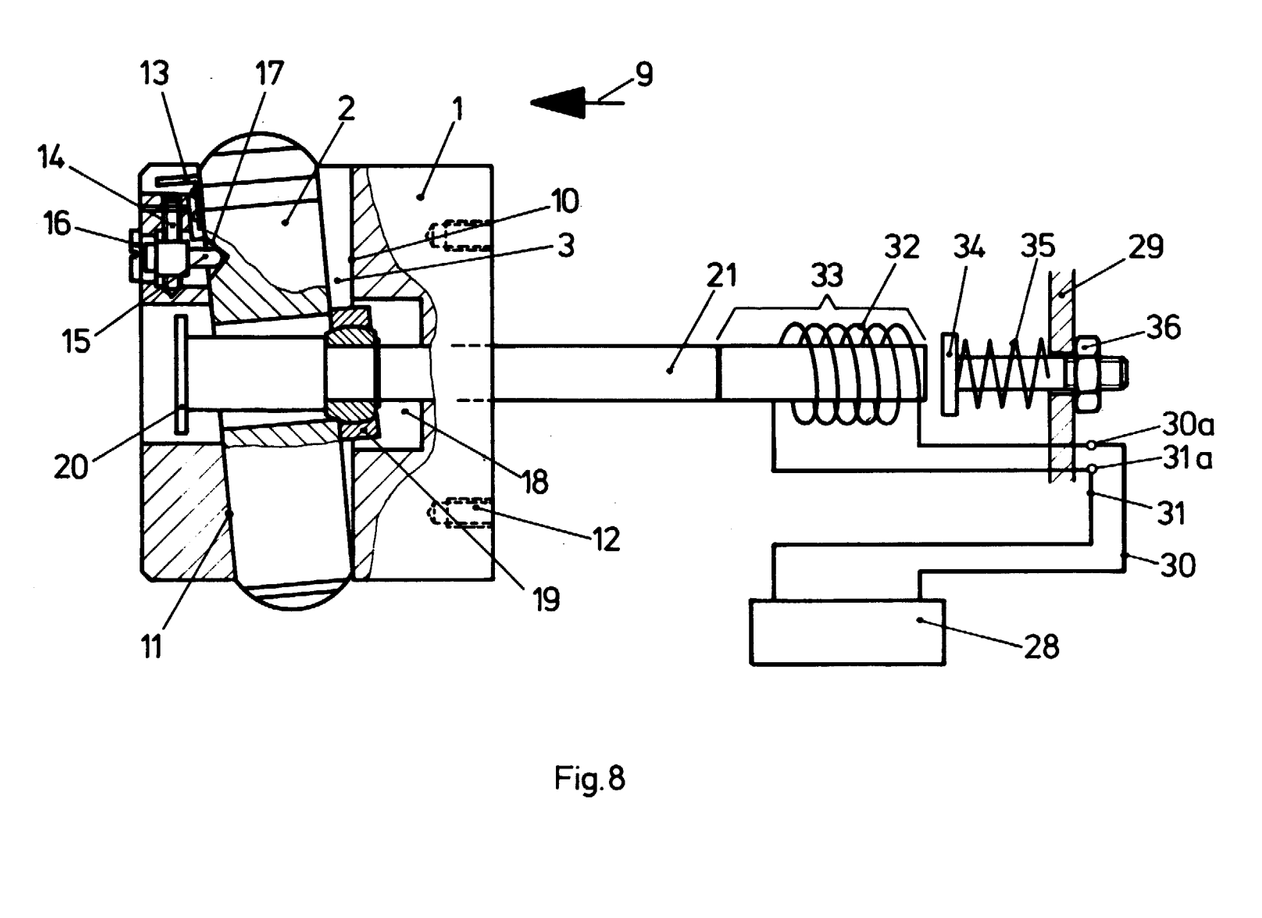

By engagement of the spherical front end of the positioning bolt 15 into the depression 17, the knife 2 will be, in correspondence with the position of the positioning bolt 15, moved in radial direction during its tilting movement to its withdrawal position. If the position of the positioning bolt is properly adjusted, the knife 2 will therefore by brought into an exact position of symmetry during its tilting movement to the withdrawal position. Thereby an engagement of the cutting edges of the knife 2 with the finished surface in the workpiece during the return stroke of the tool will be positively prevented. If now, the spool 32 of the electromagnet means is again poled in reverse direction by the control mechanism 28, the armature 33 is pulled into the spool 32 so that the collar 20 will engage the front face of the knife 2 to move the latter again to its working position. During such movement the abutment 19 is received in a cutout 18 of the tool head.

Figure 9:
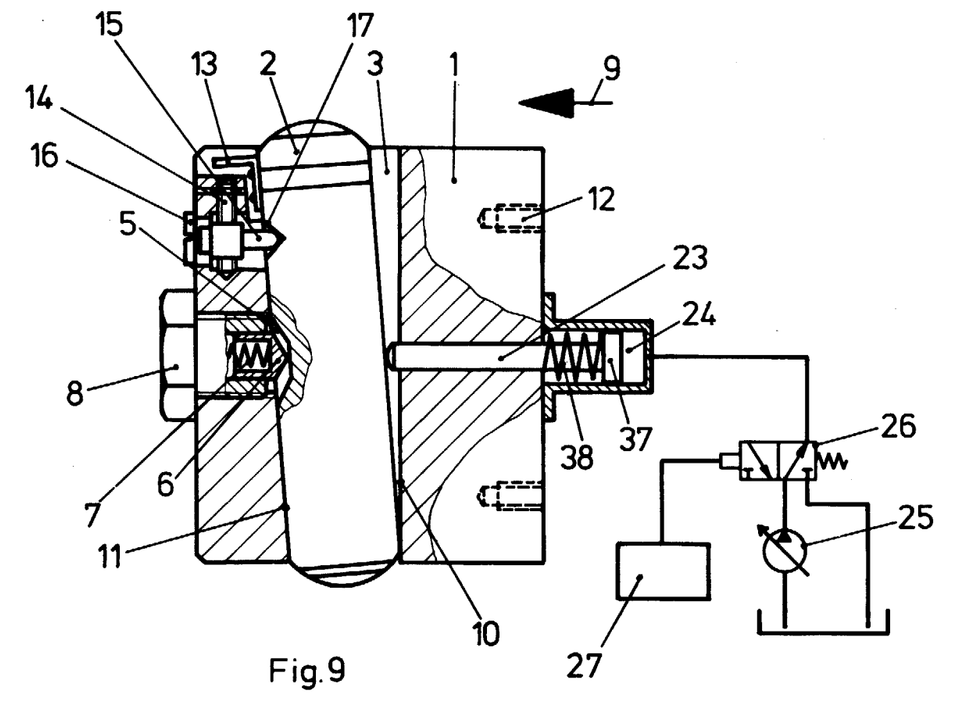

FIG. 9 illustrates a further embodiment according to the present invention in which the knife 2 may be positively moved to its working, respectively its withdrawal position. For tilting the nife 2 to its working position an arrangement as already described in connection with FIG. 1, may be used, in which the pressure element 6 with its spring 7 has the task to tilt the knife at the end of the return stroke of the tool automatically again to its working position. Since in this case the tilting movement of the knife to its withdrawal position will be also positively enforced as will be described below, the spring 7 may be constructed in this case as a very strong spring. Such a strong spring 7 is necessary when, for instance, the inner surfaces of a tube provided with transverse bores has to be machined. The strong spring prevents thereby that the knife 2, during its passage over the transverse bores, due to different axial forces acting on the cutting edges of the knife, will tilt forwardly. In order to positively move the knife 2 against the force of the spring 7 to its withdrawal position, as shown in FIG. 9, a solenoid operated valve 26 is switched by a control mechanism 27 of known construction to a position, as shown in FIG. 9, in which pressure fluid produced by a pump 27 is fed into one end of a cylinder 24, connected to the right end face of the tool head 1, so that a piston 37 axially guided in the cylinder 24 and the piston rod 23 connected thereto is moved against the force of a coil compression spring 38 toward the left, as viewed in FIG. 9, that is the direction of the working stroke of the tool head as indicated by the arrow 9. Thereby the front end of the piston rod 23 engages the rear face of the knife 2 to move the latter against the force of the compression spring 7 to its withdrawal position. If subsequently thereto the solenoid operated valve 26 is moved by the control mechanism 27 to its other position, then the pressure space in the cylinder 24 is connected with the tank and the spring 38 moves the piston 37 and therewith the piston rod 23 back to its rearward position, in which the front end of the piston rod is disengaged from the knife. In this position of the piston rod, the knife will be moved by the spring 7 and the pressure element 6 again to its working position.

The above-described boring tool is especially used for deep boring of workpieces. Thereby it is possible to use the tool head with its knife as described alone or in combination with smooth rolling tools. In order to properly guide the tool head in the bore of the workpiece, the tool head may be provided with a plurality of guide bars 4, as shown in FIG. 2, which project circumferentially spaced from each other, beyond the peripheral surface of the tool head 1.

It will be understood that each of the elements described above, or two or more together, may also find a useful application in other types of boring tools provided with a cutting knife having opposite cutting edges and being slidably arranged in a slot of the tool head extending transverse to the axis thereof and tiltable in the slot between a working and a withdrawal position differing from the types described above.

While the invention has been illustrated and described as embodied in a tool head as described above in which the knife may be positively moved between its working and its withdrawal position, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a boring tool, a combination comprising a tool head having an axis and being turnable about said axis; means mounting said tool head movable in the direction of said axis along a working stroke and a return stroke; a cutting knife having opposite cutting edges projecting beyond said tool head; and means mounting said cutting knife on said tool head for oscillating movement transverse to said axis and for tilting movement in a plane including said axis between a working position and a withdrawal position in which said cutting edges project through a smaller distance beyond said tool head than in said working position.

2. A combination as defined in claim 1, wherein said mounting means comprises a slot in said tool head extending transverse to said axis through said tool head with the width of the slot continuously increasing from one to the other end of said slot.

3. A combination as defined in claim 2, wherein said slot is in part defined by a pair of opposite faces, one of said faces trailing in the direction of movement of said tool head during the working stroke and extending substantially normal to said axis and the other leading in said direction and extending forwardly inclined at an acute angle to said one face, said knife being adapted to abut against said one face during the working stroke of said tool head to be thereby maintained during said working stroke in said working position, and including means to at least temporarily press said knife against said one face.

4. A combination as defined in claim 3, wherein said pressing means comprise spring means biased to yieldably maintain the knife in abutment with said one face of said slot with a predetermined force which is smaller than a friction force between the cutting edges of the knife and the workpiece during return stroke of the tool head.

5. A combination as defined in claim 3, adapted to abut against the other of said faces during the return stroke of said tool to thereby be maintained during said return stroke in said withdrawal position, and including means for pressing the knife against the other of said faces.

6. A combination as defined in claim 3, wherein said pressing means comprise a member reciprocable in the direction of said axis and electromagnet means connected to said member for moving the latter, when energized, in the direction opposite to the working stroke of said tool head to thereby press said knife against said one face of said slot.

7. A combination as defined in claim 6, wherein said knife has a front face opposite said other face of said slot and is provided with a central bore extending in direction of said axis from said front face of said knife to an opposite face thereof, said member being in form of a rod extending with ample clearance through said bore and having a collar arranged to engage said front face of said knife upon energizing said electromagnet means to thereby move said knife to its working position engaging with the other face thereof said one face of said slot.

8. A combination as defined in claim 7, and including means biasing said rod in a direction of said working stroke of said tool head to thereby move said collar, when said electromagnet means is deenergized, away from said front face of said knife so that the knife is free to tilt to said withdrawal position during the return stroke of said tool head.

9. A combination as defined in claim 7, and including releasable coupling means connecting said rod to said electromagnet means.

10. A combination as defined in claim 2, wherein said slot is in part defined by a pair of opposite faces, one of said faces trailing in the direction of movement of said tool head during the working stroke and extending substantially normal to said axis and the other of said faces leading in said direction and extending forwardly inclined at an acute angle to said one face, said knife being tiltable in said slot to abut during the working stroke of the tool head against said one face to thereby be maintained during said working stroke in said working position and said knife being adapted to abut during said return stroke of said tool head against the other of said faces to thereby be maintained during said return stroke in said withdrawal position, and including means cooperating with said knife for positively tilting the same between said positions thereof independent of any friction forces between the knife edges and the workpiece to be machined.

11. A combination as defined in claim 10, wherein said knife has a pair of opposite faces respectively directed toward said faces of said slot and is provided with a central bore extending in direction of said axis from one to the other of said opposite faces thereof, said means for positively tilting said knife between said positions thereof, comprising a reciprocatable rod extending with ample clearance through said bore and carrying to opposite sides of said knife a pair of abutment members spaced from each other a distance greater than the width of said knife and having each a transverse dimension greater than the diameter of said bore, and means for reciprocating said rod to thereby tilt said knife between said working and said withdrawal position.

12. A combination as defined in claim 11, wherein said reciprocating means comprise electromagnet means including an armature connected to said rod and a spool surrounding said armature in which the latter is reciprocable, and means for changing the direction of flow of current through said spool so that, when said electromagnet means is energized in one direction, said armature is pulled into said spool to thereby move said knife to said working position and so that, when said armature is energized in the other direction, said armature is pushed out of said spool to thereby move said knife to said withdrawal position.

13. A combination as defined in claim 12, and including biasing means cooperating with said rod for moving the latter, when said electromagnet is deenergized, and said knife is in said working position, to a neutral position in which one of said abutment means is spaced from said knife a distance permitting said knife to tilt freely from said working position to said withdrawal position.

14. A combination as defined in claim 10, wherein said means for positively tilting said knife between said positions thereof comprise resilient means biased to tilt said knife from said withdrawal position to said working position and to maintain said knife in said working position during the working stroke of said tool head, and hydraulically operated means to tilt said knife from said working position to said withdrawal position against the force of said resilient means during the return stroke of said tool head.

15. A combination as defined in claim 14, wherein said hydraulically operated means comprise a cylinder, a piston reciprocable in said cylinder and having a piston rod adapted to engage the knife, spring means cooperating with said piston for biasing the latter in one direction, a source of pressure fluid, a conduit connecting said source with one end of said cylinder, and a valve in said conduit movable between a first position for feeding pressure fluid into said cylinder to move said piston rod against the force of said spring means in a direction tilting the knife from the working to the withdrawal position, and a second position discharging pressure fluid from said cylinder so that said piston is moved by said spring means in the opposite direction.

16. A combination as defined in claim 1, and including means for maintaining the cutting edges of said knife, when the latter is in said withdrawal position, equally spaced from said axis of said tool head.

17. A combination as defined in claim 2, wherein said slot is in part defined by a pair of opposite faces, one of said faces trailing in the direction of movement of said tool head during the working stroke and extending substantially normal to said axis and the other of said faces leading in said direction and extending forwardly inclined at an acute angle to said one face, said knife being adapted to abut against said one face during the working stroke of said tool head and said knife having a front face abutting in said withdrawal position thereof against the other of said faces of said slot, and including means for maintaining the cutting edges of said knife in said withdrawal position equally spaced from said axis of said tool head, said maintaining means comprising a position bolt projecting beyond said other face of said tool head in a corresponding cutout in said one face of said knife.

18. A combination as defined in claim 17, wherein said positioning bolt has a spherical end adapted to engage in said cutout and wherein said cutout has a conical shape, and including means for radially adjusting the position of said positioning bolt.

* * * * *